S. P. RUGGLES.
Improvement in Type for the Blind.
No. 132,370. Patented Oct. 22, 1872.
Fig. 1.
a|b|c|d|ɛ|f|ɢ|h|i|J|k|l|m|n|o|p|q
Fig. 2.
a|b|c|d|e|f|g|h|i|J|k|l|m|n|o|P
Fig. 3.
a|b|c|d|e|f|g|h|i|j|k|l
Fig. 5.
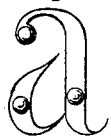
Fig. 4.
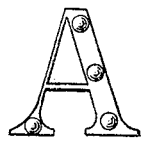
Fig. 6.
Fig. 7.
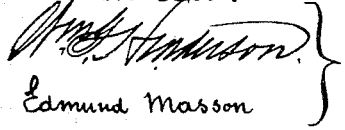
Witnesses.
Wm. H. Anderson
Edmund Masson
Inventor.
Stephen P. Ruggles.
By atty A. B. Stoughton.

UNITED STATES PATENT OFFICE.

STEPHEN P. RUGGLES, OF BOSTON, MASSACHUSETTS.

IMPROVEMENT IN TYPE FOR THE BLIND.

Specification forming part of Letters Patent No. 132,370, dated October 22, 1872.

*To all whom it may concern:*

Be it known that I, STEPHEN P. RUGGLES, of Boston, in the county of Suffolk and State of Massachusetts, have invented certain new and useful Improvements in Type for Printing, so as to be easily read by the blind, and by the seeing, and I do hereby declare the following to be a full, clear, and exact description of the same, reference being had to the accompanying drawing, making a part of this specification, in which—

Figures 1 2 3 4 represent plans of portions of the letters of the alphabet, which will illustrate the characteristics of all of the letters, and Figs. 5, 6, and 7 represent plans of individual letters, drawn on an enlarged scale to better illustrate the elevations thereon.

The face surfaces of type for the blind have heretofore been made flat or level on top, giving a corresponding flat or level surface to the impression made from them.

My invention consists in making type for the blind of different elevations of surface by dots or otherwise, so that they may be correctly known by the touch; and my invention further consists in combining such different elevations or raised dots or marks upon the surface, with letters or characters of plain, angular, embossed, or ornamented form, so that they can be readily designated or read by the blind and by the seeing.

The blind, in reading printed or impressed matter, cannot tell anything about the shape of the letters that they read by the touch, but are remarkably quick in understanding the position of dots or, what would be substantially the same thing, elevations upon particular portions of the face or surface of the type; and for the blind alone the letters or characters may be entirely formed of such elevations or dots upon certain portions of what may designate letters of the alphabet, or locations that would designate certain letters or characters. But it is desirable also that the seeing should be able to correctly and expeditiously read the same printing and embossing designed for the blind, and for this purpose I make, as it were, two letters on the same back, one for the blind and one for the seeing. If the letters be of angular, arabesque, or Italian style, then the corners, angles, or other prominent portions of the type are elevated, so that the position or location of these prominent portions may designate to the touch of the blind the particular letter. If the letters be of Roman form, plain, or embossed, the elevations or prominences may be made by dots, the position or location of which will indicate to the touch of the blind the letter or letters; and as above stated, in so far as such letters are to be used solely for the blind, there may be no more of the letter than these elevations—that is, it may have no body or lines connecting these elevations or dots. But so that the seeing may easily read such letters, a body more or less in outline is made, and these elevations and dots arranged at such portions of the body or outline as will also enable the blind to read by the touch, gives to such type or the impression taken from them the character of two letters on one back. If the elevations be at the corners of the type these corners will by use wear round, and then the locality or position of the elevation being somewhat changed may confuse the blind, because the location or position is altered. With the dots, though they may wear down and make less prominent impressions, yet they continue to be dots, and do not lose or change their position or location. So, too, if the type be made in the usual form, being level on top and the corners or projections that the blind feel most distinctly should become worn by use or otherwise, they begin to feel to the touch like something else, and would confuse them. But with the dots this would not occur, for the reason above stated.

Having thus fully described my invention, what I claim is—

1. Type for the blind, whereby the letters are known to the touch by elevations on the face of the type in marks or dots, the location or position of which indicates the letter, substantially as described.

2. I also claim, in type which have portions of their faces elevated so as to be read by the blind, the connecting of such elevations, or locating them upon the body or outline of any known type-letters, so as to be as readily read by the seeing, substantially as described.

STEPHEN P. RUGGLES.

Witnesses:
F. O. PRINCE.
C. E. SANBORN.